UNITED STATES PATENT OFFICE.

WILLIAM Y. SINGLETON, OF SPRINGFIELD, ILLINOIS.

IMPROVEMENT IN WATER-PROOF CEMENT.

Specification forming part of Letters Patent No. 4,333, dated December 26, 1845.

*To all whom it may concern:*

Be it known that I, WILLIAM Y. SINGLETON, of Springfield, in the county of Sangamon and State of Illinois, have discovered a new and useful Composition for Covering the Roofs and Sides of Buildings for Rendering them Impervious to Water and Proof against Fire, which is described as follows:

Take lime, sand, and charcoal (the latter to be ground or pulverized very fine) in suitable proportions, to which add a sufficient quantity of water to render them, when well mixed, of a proper consistence.

To use this composition a proper bed or foundation must be prepared of laths and mortar in the usual manner of first-coat work. The composition is then spread evenly over this bed or foundation in a regular layer of about an eighth of an inch thick and well troweled smooth, or as thick as may be required. A small quantity of iron cinders ground fine may be added to cause the composition to harden quicker. Common stone-coal finely pulverized will answer as a substitute for the charcoal to render the cement impervious to water, but is not so good as the latter.

What I claim as my discovery, and desire to secure by Letters Patent, is—

The before-described composition of lime, sand, and charcoal, forming a cement that is impervious to water—that is to say, the use of charcoal and stone-coal as a component part of plaster or cement, by which it is rendered impervious to water.

W. Y. SINGLETON.

Witnesses:
    WM. P. ELLIOT,
    A. E. H. JOHNSON.